United States Patent Office 3,554,992
Patented Jan. 12, 1971

3,554,992
POLYMERISATION CATALYSTS AND
USES THEREOF
Donald Charles Lamb, Norton-on-Tees, England, assignor to Imperial Chemical Industries Limited, London, England, a corporation of Great Britain
No Drawing. Filed Mar. 25, 1968, Ser. No. 715,523
Claims priority, application Great Britain, Apr. 11, 1967, 16,475/67; Oct. 2, 1967, 44,775/67
Int. Cl. C08f 3/38, 15/10
U.S. Cl. 260—91.1                        7 Claims

ABSTRACT OF THE DISCLOSURE

A novel catalyst for vinyl ether homo or heteropolymerisation comprises a Grignard complex RXMg (hal) mounted on or in a solid support. R is a hydrocarbon group such as phenyl or an alkyl group, (hal) is a halogen and X is oxygen, sulphur, selenium or tellurium or is introduced by reacting a Grignard reagent RMg(hal) with a compound containing an unsaturated linkage between different elements or with an olefine oxide. Preferably X is O or $CO_2$ and the complex may be formed in situ on the support. In the polymerisation the vinyl ether with or without other unsaturated monomers is contacted in the liquid phase with the catalyst, preferably in continuous fashion with a bed or column of the catalyst.

---

The present invention relates to a new polymerisation catalyst, a method for its preparation, and to its use in polymerising ethylenically unsaturated monomers, particularly vinyl ethers.

Vinyl ethers, especially alkyl vinyl ethers, are by virtue of their ethylenic unsaturation useful as polymerisable monomers. In addition the alkyl group and the ether linkage confer valuable properties on the polymers produced. Thus homopolymers of alkyl vinyl ethers may be used in the formulaton of adhesives, lubricants and greases and surface coatings. Heteropolymers with other monomers such as styrene find outlets for example in the manufacture of clear moulding resins of high impact strength. The most important alkyl vinyl ethers for such applications are methyl vinyl ether, ethyl vinyl ether and isobutylvinyl ether although higher vinyl ethers such as laurylvinyl ether and isodecyl vinyl ether are also used.

Although the polymers possess such useful and valuable properties as those listed above, the development of vinyl ether polymers has been restricted by difficulties experienced in their polymerisation. Acid initiated polymerisation has been found to be the most effective technique but it is accompanied by certain disadvantages. For example the presence of trace impurities of high di-electric constant such as water can affect the rate of chain propagation and induce termination of the polymer chain. The alkyl vinyl ether monomers are also very reactive under acid conditions and often polymerise with explosive violence. This danger compels the polymerisation to be carried out at low temperatures, e.g. —40° C., particularly when high molecular weight polymers are required which among other difficulties tends to produce polymers with an undesirable proportion of crystallinity. Another disadvantage of the acid catalysts is the difficulty in removing them from the polymers afer the polymerisation. Acid catalyst residues left in the polymer are capable of causing chain scission and depolymerisation.

We have now found a catalyst which avoids many of the above disadvantages. In particular the polymerisation can be carried out without the need for refrigeration and the finished polymer is readily separable from the catalyst.

According to the invention a novel catalyst for the homopolymerisation of a vinyl ether or the heteropolymerisation of a vinyl ether with another ethylenically unsaturated monomer comprises a Grignard complex of formula:

$$RXMg(hal)$$

contained on or in a solid support.

In the formula RXMg(hal) R is an alkyl, cycloalkyl, aryl, alkaryl, aralkyl or a heterocyclic group, (hal) is chlorine, bromine or iodine and X represents oxygen, sulphur selenium or tellurium or is a group introduced by the reaction of a Grignard reagent R'Mg(hal) (in which R' is a hydrocarbon group) with an olefine oxide or a compound containing an unsaturated linkage between different elements. In such reactions the group R' attaches to the relatively less acid element and the group Mg (hal) to the relatively more acidic element.

In the Grignard reagent R'Mg(hal) R' is a hydrocarbon group which may be alkyl, cycloalkyl, e.g. cyclohexyl, aryl, alkaryl, aralkyl or a heterocyclic group. Phenyl or alkyl substituted phenyl groups, such as tolyl, or alkyl groups containing up to 10 carbon atoms are preferred. Suitably R' may be phenyl, tolyl, benzyl, methyl, ethyl, propyl, butyl, amyl or hexyl.

The compound containing an unsaturated linkage may be organic or inorganic in nature. For example:

(a) Nitriles, e.g. aliphatic nitriles such as acetonitrile and propionitrile and aromatic nitriles such as benzonitrile, the reaction being:

R"C:N+R'Mg(hal)→
       RC:NMg(hal) in which R=(R'R")

(b) Nitroso compounds, principally aromatic nitroso compounds such as nitrosobenzene. The reaction in this case is:

R"N=O+R'Mg(hal)→
       RNOMg(hal) in which R=(R'R")

(c) Aldehydes, ketones or esters, in which the unsaturated linkage is between carbon and oxygen. The aldehyde, ketone or ester may be aliphatic or aromatic in nature e.g. alkanals or alkanones containing up to 12 carbon atoms e.g. acetone, acetaldehyde, methyl ethyl ketone and heptaldehyde. Suitable esters include those of the lower fatty acids e.g. acetic acid esters. For example:

R"R'''CO+R'Mg(hal)→
       RCOMg(hal) in which R=(R'R"R''')
R"CHO+R'Mg(hal)→
       RCOMg(hal) in which R=(R'R"H)
R"COOR'''+R'Mg(hal)→
       R"COR'+ROMg(hal) in which R=(R''')

Among the inorganic compounds containing an unsaturated linkage which may be used are carbon dioxide, carbon disulphide, nitrogen dioxide, nitric oxide and sulphur dioxide, the reaction being:

RMg(hal)+$CO_2$→RCOOMg(hal)
RMg(hal)+$CS_2$→RCSSMg(hal)
RMg(hal)+$NO_2$→$RNO_2$Mg(hal)
RMg(hal)+$SO_2$→$RSO_2$Mg(hal)
RMg(hal)+NO→RNOMg(hal)

Olefine oxides which may be used include ethylene and propylene oxides. The reaction being e.g.:

$(CH_2)_2O$+R'Mg(hal)→ROMg(hal)
       in which R=(R'$CH_2CH_2$)

Examples of R in the Grignard complex are cyclohexyl, phenyl, benzyl or tolyl. Preferably R is an alkyl group, more preferably an alkyl group containing up to 20 carbon atoms, for example, methyl ethyl, propyl, butyl, amyl, nonyl, decyl, lauryl, pentadecyl or octadecyl.

Chlorine and bromine are the preferred halogens, principally because of the ready availability of Grignard complexes containing them.

The solid support is inert and serves only to carry the Grignard complex. The complex may be contained on the surface of the support, or in the pores and interstices of a microporous support. Suitable supports include stainless steel helices ceramics such as earthenware and porcelain, alumina, asbestos, charcoal and silica. The support may be in any convenient physical form but is preferably selected so as to expose the greatest internal and/or external surface area on which the Grignard complex may be carried. When the support is a ceramic it may advantageously be used in bead or ring form.

The Grignard complex is most readily formed in situ on the support. This may be accomplished by first coating the support with the Grignard reagent RMg(hal) and then treating the coated support with one of the reactants described above e.g. oxygen or carbon dioxide, which give rise to preferred forms of the Grignard complex.

Thus ceramic rings or beads or stainless stell helices may be soaked in a solution containing an alkyl magnesium chloride or bromide. Evaporation of the solvent by carbon dioxide or air blowing of the coated rings, beads or helices yields the desired catalyst i.e. (alkyl) OMg(hal) or (alkyl) COOMg(hal) deposited on the support. Preferably the solvent from which the Gregnard reagent is deposited is di-ethyl ether.

In some instances it may be advantageous to heat the complex after its formation to alter its selectively in the polymerisation of vinyl ethers. For example if $$C_4H_9SO_2MgBr$$

is heated to a temperature of 65° C. after its formation it is more active for the polymerisation of methyl vinyl ether than for isobutyl vinyl ether. Generally the complex may be heated up to 300° C. preferably up to 250° C. If the complex is not heated its activity is different being more active in polymerising isobutyl vinyl ether than methyl vinyl ether.

The catalysts of the present invention may be used to polymerise vinyl ethers either alone or with an ethylenically unsaturated comonomer. The most important vinyl ethers are the alkyl vinyl ethers particularly alkyl vinyl ethers in which the alkyl group contains up to 20 carbon atoms. Examples of such ethers are methyl vinyl ether, ethyl vinyl ether, isobutyl vinyl ether, lauryl vinyl ether and isodecyl vinyl ether.

Ethylenically unsaturated monomers which may be polymerised with the vinyl ethers include styrene, maleic anhydride, acrylonitrile, vinyl chloride, acrylate esters and similar monomers which do not contain active groups which may deactivate the catalyst.

The polymerisation process is carried out in the liquid phase preferably at a temperature in the range 20° to 100° C. It is convenient to use an inert solvent to bring the vinyl ether and other monomer (if one is used) into contact with the catalyst. Suitable solvents are hydrocarbon solvents particularly aromatic hydrocarbon solvents such as benzene and toluene or alkane solvents such as hexane or polar solvents such as di-ethyl ether and methylene chloride. The monomers preferably form 25 to 75% by weight of the solution and in a batch process the weight percent of the catalyst used is preferably 0.5 to 5, more preferably 0.5 to 1.0 (the precentage figures refer to the weight of RXMg(hal) not to the weight of the Grignard complex plus support).

Although in general the polymerisation is conducted at ambient pressure, for the lower boiling ethers elevated pressure e.g. up to 50 atmospheres may be used. For example methyl vinyl ether was polymerised in the presence of $C_4H_9OMgBr$ at a pressure of 20 atmospheres.

The polymerisation may also be carried out in a continuous manner by passing a solution of the monomer(s) over a bed or through a column packed with the catalyst.

The polymer may be recovered from the solution leaving the bed or column by distilling off the solvent and excess monomer or by precipitating the polymer with for example methanol. For some applications e.g. adhesives, the polymer solution may be used directly. The continuous process is particularly advantageous because the heat of reaction may be removed by the solution flowing over the catalyst and because the separation of catalyst and polymer solution does not require a separate step.

The invention will now be further described by reference to the following examples.

EXAMPLE 1

Catalyst preparation (1a) Dry magnesium turnings (8.9 grams) and dry di-ethyl ether (50 mls.) were placed in a round-bottomed flask fitted with a stirrer and a condenser cooled by solid carbon dioxide. The flask was purged with argon. n-Bromobutane (50 grams) in di-ethyl ether (100 grams) was then added dropwise to the reaction vessel over a period of 30 minutes. The reaction vessel was cooled by means of a water bath so that a gentle reflux rate was maintained.

When the reaction was complete ceramic beads were soaked in the ethereal Grignard solution and air blown causing the catalyst to be precipitated. The coated beads were then packed into a column.

Alternatively the column was packed with ceramic beads and the Grignard solution run down the column. Air was blown up the column thereby precipitating the catalyst in situ.

(1b) Catalysts were prepared in similar fashion to the above using fired alumina pellets and stainless steel helices instead of ceramic beads. By blowing with carbon dioxide instead of air catalysts containing n-butyl carboxy magnesium bromide were obtained.

Polymerisation (2) A 50% solution of isobutyl vinyl ether in toluene was pumped through a water jacketed column prepared as described above containing ceramic beads coated with n-butyloxymagnesium bromide. Water at 50° C. was circulated through the column. The polymer formed was precipitated from solution by ammoniacal methanol.

A column packed with precoated ceramic beads still gave satisfactory polymerisation after 66 hours while the column coated in situ as described above still gave satisfactory polymerisation after 41½ hours.

EXAMPLE 2

Catalyst preparation (1) A water jacketed column maintained at 30° C. was packed with α-alumina pellets and a 20% ethereal solution of n-butylmagnesium bromide run down it. Sulphur dioxide was then blown up the column precipitating the complex $C_4H_9SO_2MgBr$ on the pellets.

Polymerisation (2) Methyl vinyl ether was passed through the column prepared as in (1) above and collected from the top of the column in a reservoir. Samples were taken of the reservoir contents at regular intervals and 10 ml. of methanol was added to each sample to destroy any catalyst which might be present. The sample was then heated at 65° C. under vacuum (2 mm. mercury) for 15 minutes. The weight of polymer collected was recorded.

| Sample: | Reaction times, minutes | Weight of polymer produced, grams |
| --- | --- | --- |
| 1 | 30 | 5½ |
| 2 | 60 | 2½ |
| 3 | 90 | 1¾ |

The following experiments are illustrative of the range of Grignard complexes which when contained on or in a solid support form the catalysts of the present invention. Although the Grignard complex may be used without the support, as is described below, this method is inferior, particularly in the operation of a continuous commercial process to the supported catalyst of the present invention.

(a) 18 grams of bromobenzene were slowly added to 3 grams of magnesium turnings in 100 grams of refluxing diethyl ether. Solid carbon dioxide was then added to the cooled ethereal solution, the ether removed, and the product $C_6H_5CO_2MgBr$ dried under vacuum at 50° C. for 2 hours. 5 grams of the complex were added to 53 grams of isobutyl vinyl ether and 50 grams of toluene and the mixture heated at 50° C. for 2 hours. The yield of polyisobutyl vinyl ether was 91% of the theoretical.

(b) A 20% solution of isobutyl magnesium bromide in ether was prepared by a similar technique to that used in Example 1. Stoichiometric amounts of this complex and isobutyraldehyde were reacted together and 1 gram of the complex so formed:

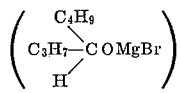

added to 8 grams of isobutyl vinyl ether, the mixture being maintained at a temperature of 20° C. for 100 hours. The yield of polyisobutyl vinyl ether was 96% of the theoretical.

(c) Experiment (b) was repeated replacing the isobutyraldehyde by propylene oxide. The complex obtained was

and the yield of polyisobutyl vinyl ether was 48% of the theoretical.

(d) 20 mls. of a 20% solution of n-butyl magnesium bromide, prepared as in Example 1, was reacted with 30 mls. of liquid sulphur dioxide at −40° C. The product, $n-C_4H_9SO_2MgBr$, was dried at 65° C. under vacuum for 1½ hours. Half a gram of the complex was sealed in a vial with 10 mls. methyl vinyl ether for 16 hours at 30° C. to yield a colourless clear soft polymer.

(e) Experiment (d) was repeated replacing the liquid sulphur dioxide by liquid nitrogen dioxide. After 2 days at 30° C. 0.5 gram of the complex ($n-C_4H_9NO_2MgBr$) polymerised 8.0 grams of isobutyl vinyl ether.

(f) 20 mls. of a 20% solution of $n-C_4H_9CO_2MgBr$ in di-ethyl ether was added to 30 mls. of carbon disulphide at −40° C. The resulting complex $n-C_4H_9CS_2MgBr$ was dried under vacuum at 65° C. for 90 minutes. 0.5 gram of this complex polymerised 8.0 grams of isobutyl vinyl ether in 3 days at 30° C.

(g) A stoichiometric excess (24 grams) of n-butyl-acrylate was added to 12.5 mls. of a 20% $n-C_4H_9MgBr$ solution in di-ethyl ether prepared as in Example 1. A further 50 mls. of di-ethyl ether and 36 grams of isobutyl vinyl ether were added and the solution heated at 50° C. for 2½ hours. The polymer obtained was dried and found to weigh 46 grams.

(h) 50 mls. of a 20% solution of n-butyl magnesium bromide prepared as in Example 1, 100 mls. n-hexane and 50 mls. of isobutyl vinyl ether were heated to 50° C. 30 mls. of isobutyl vinyl ether and 30 mls. of isobutyraldehyde were added to the solution over a period of 2 hours and the reaction mixture allowed to stand for 3 days. The polymer was dried and found to weigh 65 grams.

I claim:
1. A process for the homopolymerization of an alkyl vinyl ether containing up to 20 carbon atoms in the alkyl group or the heteropolymerization of said vinyl ether with another ethylenically unsaturated monomer selected from the group consisting of styrene, maleic anhydride, acrylonitrile, vinyl chloride and acrylate esters which comprises contacting in a liquid phase said ether or said ether and said monomer with a catalytic amount of a catalyst which comprises a Grignard complex of formula RXMg(hal) and an inert support therefor in which R is an alkyl, cycloalkyl, aryl, alkaryl, aralkyl or a heterocyclic group (hal) is chlorine, bromine or iodine and X is selected from the group consisting of O, S, Se, Te, C:N, NO, CO, COO, CSS, $NO_2$ and $SO_2$.

2. The process of claim 1 in which R is cyclohexyl, phenyl, benzyl, tolyl or an alkyl group containing up to 20 carbon atoms.

3. The process of claim 1 in which the inert catalyst support is selected from the group consisting of stainless steel helices, earthenware, porcelain, alumina, asbestos, silica and charcoal.

4. The process of claim 1 in which the catalyst is heated before the polymerization to a temperature of up to 300° C.

5. The process of claim 1 in which a temperature in the range 20° to 100° C. is used.

6. The process of claim 1 in which a solvent is present.

7. The process of claim 1 in which said alkyl vinyl ether is continuously passed in solution in an aromatic hydrocarbon solvent or in diethyl ether or methylene chloride over a bed or through a column of a Grignard complex of Formula RXMg(hal) contained on or in a solid inert support, in which R is phenyl, benzyl, tolyl, methyl, ethyl, propyl, butyl or amyl, X is $NO_2$, $SO_2$, $CS_2$, O or $CO_2$ and (hal) is chlorine or bromine.

References Cited
UNITED STATES PATENTS

| | | | |
|---|---|---|---|
| 3,085,997 | 4/1963 | Martin | 260—91.1A |
| 3,143,577 | 8/1964 | Bryce-Smith et al. | 260—91.1M |
| 3,159,613 | 12/1964 | Vandenberg | 260—91.1M |
| 3,208,984 | 9/1965 | Dekking | 260—91.1M |
| 3,326,877 | 6/1967 | Orzechowski et al. | 260—94.9D |
| 3,403,142 | 9/1968 | Craven | 260—94.9D |

HARRY WONG, Jr., Primary Examiner

U.S. Cl. X.R.

252—431; 260—78.5, 80.3, 85.5, 86.1, 87.5, 88.1